March 2, 1954 W. E. WILLIAMS 2,670,630
BELT DRIVE TRANSMISSION WITH FRICTION REVERSE
Filed Dec. 3, 1951 2 Sheets-Sheet 2
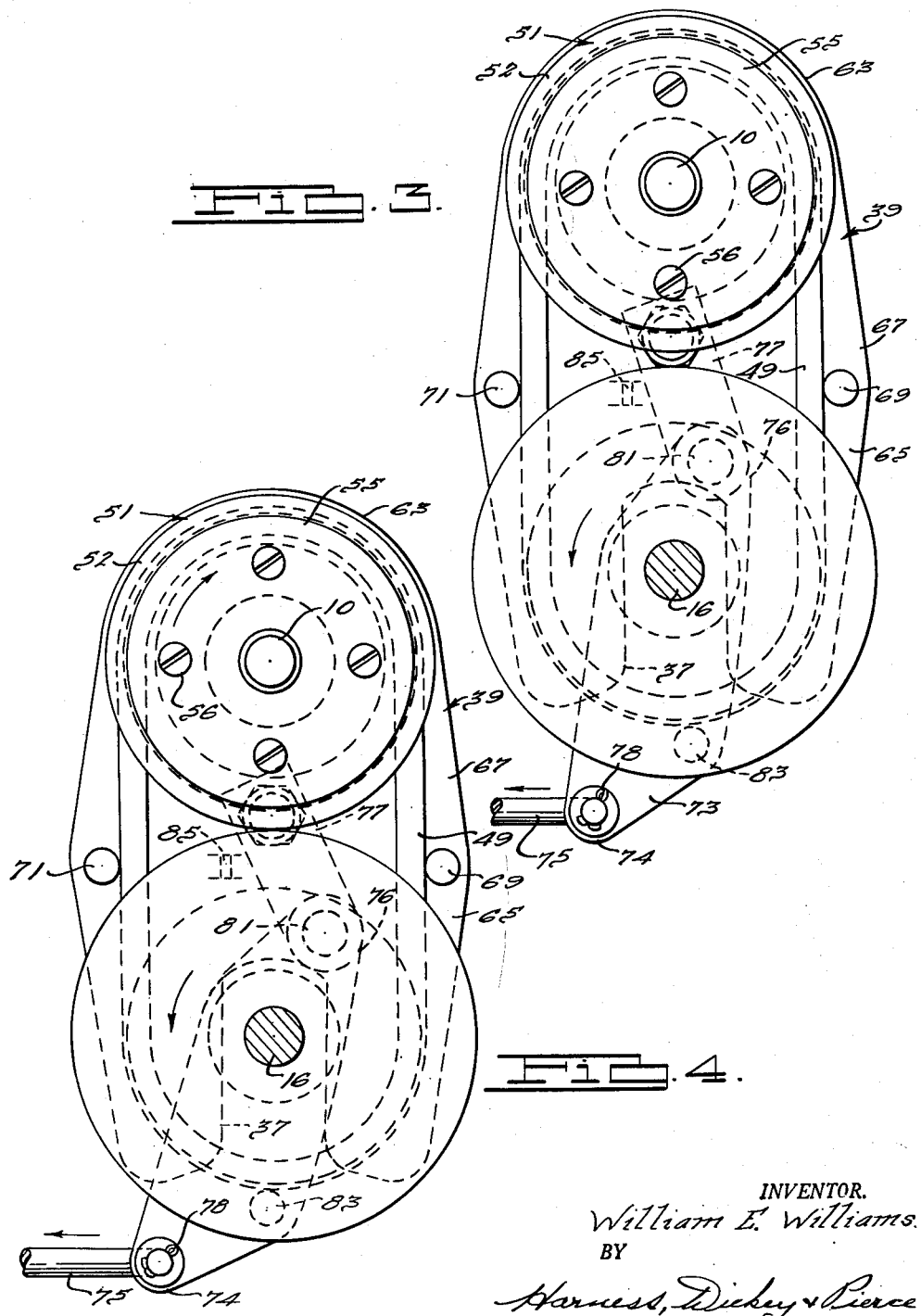
INVENTOR.
William E. Williams.
BY
Harness, Dickey & Pierce
ATTORNEYS.

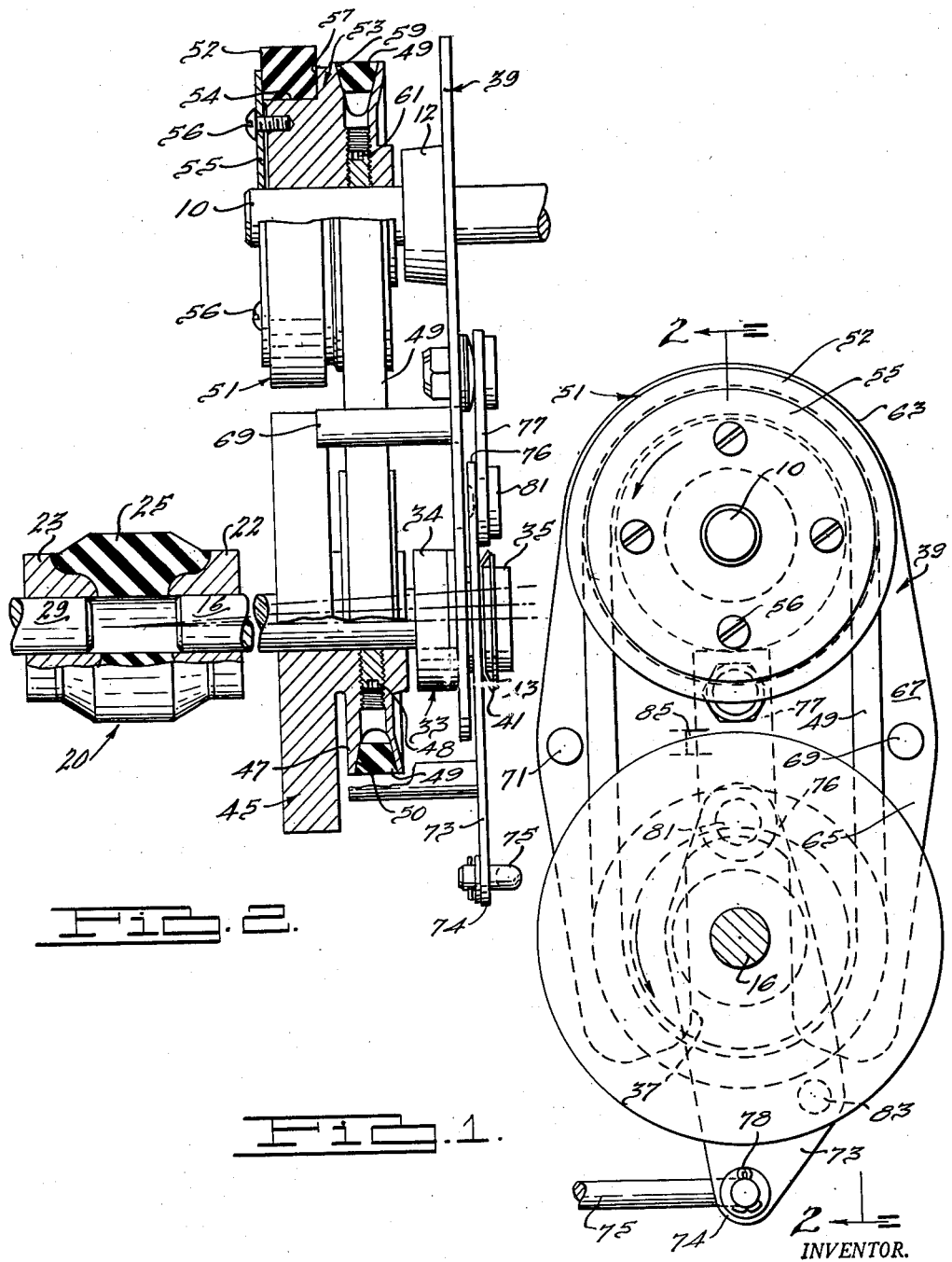

Patented Mar. 2, 1954

2,670,630

UNITED STATES PATENT OFFICE 2,670,630

BELT DRIVE TRANSMISSION WITH FRICTION REVERSE

William E. Williams, Lansing, Mich., assignor to Reo Motors, Inc., Lansing, Mich., a corporation of Michigan Application December 3, 1951, Serial No. 259,601

6 Claims. (Cl. 74—203)

The present invention relates to a transmission having a belt drive and a friction reverse which is suitable for use with small horsepower motors for driving a variety of mechanisms such, for example, as small boats, garden tractors, toy autos, etc.

The primary objects of this invention may be summarized as follows: to provide a transmission which is capable of driving a shaft in a forward or reverse direction; to provide a transmission which includes means for shifting a movable shaft to secure a driving connection in either a forward or reverse direction while concurrently maintaining the driven shaft properly aligned in its bearings; to provide a transmission which includes means for positioning the driving belt out of contact with the rotating pulleys when the transmission is in "neutral" or "reverse" driving connection.

The above and further objects and advantageous features of the invention will become apparent as the full description of the invention is developed when taken in conjunction with the accompanying drawings in which:

Figure 1 is an end elevation of the transmission of this invention showing the parts arranged in forward driving connection;

Figure 2 is a vertical sectional view of the transmission of Figure 1 taken substantially on the line 2—2 thereof and looking in the direction of the arrows;

Figure 3 is an end elevation view of the transmission of Figure 1 showing the parts arranged in "neutral" position; and, Figure 4 is an end elevation view of the transmission of Figure 1 showing the parts arranged in "reverse" driving connection.

Referring more particularly to the drawings, there is shown in Figures 1 and 2 a transmission having a driving shaft 10 journaled for rotation in bearings 12 which are carried by clutch plate 39 that is fixedly mounted on an engine and a jackshaft 16 which is adapted for movement relative to driving shaft 10 to effect a driving connection therewith.

The outer end of jackshaft 16 is supported by and attached to final drive shaft 29 by means of a flexible coupling 20 which is securely attached to final drive shaft 29 and jackshaft 16 by suitable means such as a key or set screw. Flexible coupling 20 may be either the illustrated metal and bonded rubber type having metal end portions 22, 23 connected by a central resilient portion 25 or a conventional universal joint so as to permit axial movement of the inner end of jackshaft 16. Final drive shaft 29 may be provided with any means of power take-off such as a coupling, sprocket, gear, pulley, etc. and is fixedly supported for permanent proper alignment.

The inner end of jackshaft 16 is journaled for rotation in a sliding bearing 33 which is provided with an enlarged portion 34 and a reduced diameter portion 35 which is adapted to slidably engage the generally V-shaped slot 37 of clutch plate 39 and is retained by spring clip 41 and snap ring 43 to insure against lateral movement of sliding bearing 33 during operation.

Adjacent to sliding bearing 33 and at the inner end of jackshaft 16, there is provided a pair of pulleys 45 and 47 which constitute one integral unit that is rigidly secured to jackshaft 16 by suitable means such as set screw 48. Pulley 45 may be a cylindrical metal disk having a smooth peripheral surface while pulley 47 may be a conventional pulley adapted to receive a belt 49 in an accommodating peripheral groove 50.

Driving shaft 10, the axis of which is substantially parallel to the axis of jackshaft 16, is similarly provided with a pair of pulleys 51 and 53 which may be comparable in material, shape and size to pulleys 45 and 47. Pulley 51, however, is provided with a peripheral sleeve 52 which may be fabricated from any suitable friction material such as conventional composition materials, laminated plastic materials, etc. Sleeve 52 is adapted to encircle pulley 51 and to engage a recess 54 having a width equal to the width of the pulley face. Sleeve 52 is maintained in position by face plate 55 which is suitably secured to the body portions of pulley 51 by screws 56 and as may be seen in Figure 2, face plate 55, when tightened, exerts pressure on the outer face of sleeve 52 thereby forcing sleeve 52 against shoulder 57 of the body portion of pulleys 51 and 53. Pulley 53 is provided with peripheral groove 59 adapted to accommodate belt 49, and pulleys 51, 53 are made fast on driving shaft 10 by suitable means such as set screw 61.

Driven shaft 16 and driving shaft 10 are maintained in spaced relationship by means of clutch plate 39, the upper portion 63 of which, has the general shape of pulley 51, and the lower portion 65 of which, is bifurcated and provided with slot 37 which, as previously mentioned, is adapted to guide sliding bearing 33. The central portion 67 of clutch plate 39 is somewhat wider than the end portions 63, 65, and carries a pair of belt stop pins 69, 71 adjacent to its edges. Belt stop pins 69, 71 project perpendicularly outwardly from the plane of the face of clutch plate 39 and are positioned so that belt 49 will be restrained from excessive outward bulging in its mid portions when belt 49 is out of engagement with pulleys 47 and 53. It will be appreciated that these pins tend to maintain the general shape of belt 49 so that the end portions thereof will not engage pulleys 47 or 53 when driving engagement is not desired, such as in the "neutral" or "reverse" position.

Suitable control means for positioning jackshaft 16 relative to driven shaft 10 is provided, and comprises a toggle control lever 73, control rod 75 and link toggle member 77. Toggle control lever may be formed from flat plate stock, and preferably has an external shape approximating a parallelogram with rounded corner portions. Toggle plate 73 is apertured for pivotal rotation about sliding bearing 33 and the major diagonal portions 74 and 76 are provided with apertures adapted to accommodate rods 75 and pin 81. Rod 75 is suitably secured against disengagement by key means 78. Link toggle member 77 is apertured to engage pin 81 and is a generally rectangular member having the other end thereof apertured to connect to clutch plate 39. The toggle lever 73 is provided with an outwardly projecting belt stop pin 83 which is adapted to retain belt 49 against excessive outward bulging at a position adjacent to the periphery of pulley 47. Additional belt stop pins may be used if desired in suitably spaced positions.

The forward driving connection of this transmission may be made by moving control rod 75 such that the major diagonal of toggle control lever 73 coincides with the vertical center line of the shafts 10 and 16. From this movement, link 77 is positioned vertically, thereby forcing jackshaft 16 downwardly until belt 49 tightly engages both pulleys 47 and 53. It may be seen that a safety stop 85 is positioned on clutch plate 39 such that link 77 may not assume a position which will allow the major diagonal of toggle lever 73 to go beyond the vertical center line of shafts 10 and 16. Safety stop 85 may be any suitable L-shaped flange or the like. With the belt 49 in tight engagement with pulleys 47 and 53, shaft 16 is driven in its forward direction, that is to say, in the direction which is the same as the direction of rotation of the diving shaft 10.

The "neutral" position of the transmission may be obtained by moving control rod 75 to the left, as seen in Figure 3, until jackshaft 16 is moved upwardly toward driving shaft 10 and the belt 49 is no longer in tight engagement with pulleys 47 and 53. In this position, it may be seen that belt 49 is in engagement with belt stop pins 69, 71, 83 which maintain belt 49 out of engagement with rotating pulleys 51, 53.

"Reverse" driving connection is obtained simply by moving control rod 75 further to the left. Jackshaft 16 is raised upwardly toward shaft 10 until pulley 45 contacts friction element 52 of pulley 51, and with friction pulleys 51, 45 in engagement, it will be noted that the direction of rotation of driven-shaft 16 reverses in relation to the direction of rotation of driving shaft 10. It will be further noted that in this position, also, belt 49 is maintained in contact with pins 69, 71, 83 and out of contact with rotating pulley 53. Suitable means (not shown) may be provided for maintaining rod 75 in the "forward" and "reverse" driving positions.

While only a single embodiment of the invention has been described and illustrated, it will be apparent to those skilled in the art that various minor changes, additions, omissions and substitutions may be made therein without departing from the spirit and scope of the invention.

What is claimed is:

1. A belt drive transmission having in combination a fixed driving shaft and a driven shaft movable relative to said driving shaft, each of said shafts carrying a belt drive pulley and a friction pulley, a belt encircling the belt drive pulleys, control means for moving the said driven shaft to tighten the said belt and thereby effect a forward driving connection, for moving the said driven shaft to loosen the belt so that the driving connection between the shafts is inoperative, and for engaging the said friction pulleys to thereby effect a reverse driving connection, and means for preventing the said belt from contacting the said belt drive pulleys when the driving connection is inoperative and in reverse, said control means attached to one end of said driven shaft and adapted to move said driven shaft so that the axes of said driving and driven shafts are not parallel when the driving connection is inoperative and in reverse.

2. A belt drive transmission having in combination a fixed driving shaft and a driven shaft movable relative to said driving shaft, each of said shafts carrying a belt drive pulley and a friction pulley, a belt encircling the belt drive pulleys, control means for moving the said driven shaft to tighten the said belt and thereby effect a forward driving connection, for moving the said driven shaft to loosen the belt so that the driving connection between the shafts is inoperative, and for engaging the said friction pulleys to thereby effect a reverse driving connection, means for preventing the said belt from contacting the said belt drive pulleys when the driving connection is inoperative and in reverse, said movable driven shaft having one end journaled for rotation in a sliding bearing capable of moving with said shaft and the other end flexibly coupled to a fixedly supported shaft.

3. A belt drive transmission in accordance with claim 2 wherein said driven shaft is supported by a clutch plate having an upper disc shaped portion and a lower bifurcated portion, said sliding bearing guided by said bifurcated portion, said control means consisting of a toggle control lever, a link toggle member and a control rod.

4. A belt drive transmission having in combination a fixed driving shaft and a driven shaft movable relative to said driving shaft, each of said shafts carrying a belt drive pulley and a friction pulley, a belt encircling the belt drive pulleys, control means for moving the said driven shaft to tighten the said belt and thereby effect a forward driving connection, for moving the said driving shaft to loosen the belt so that the driven connection between the shafts is inoperative, and for engaging the said friction pulleys to thereby effect a reverse driving connection, said control means being attached to one end of said driven shaft and adapted to move said driven shaft so that the axes of said driving and driven shafts are not parallel when the driving connection is inoperative and in reverse, and means for preventing the said belt from contacting the said belt drive pulleys when the driving connection is inoperative and in reverse, said last mentioned means consisting of a plurality of pins positioned adjacent the periphery of the central and end portions of the said belt.

5. In a belt drive transmission with a friction reverse, the combination of a fixed driving shaft and a movable driven shaft, a flexible coupling mounted on one end of said driven shaft and a slidable bearing mounted on the other end of said driven shaft, a clutch plate having guideways for receiving said slidable bearing and said slidable bearing slidably mounted in said guideways; means for reversibly, drivingly connecting said shafts comprising a pair of pulleys on each said shaft, each said pair having one pulley adapted for belt drive and the other pulley adapted for friction drive, similar pulleys on each shaft being in substantial alignment, and a belt encircling the belt drive pulleys, control means for positioning the said movable shaft so that the driving connection between the shafts is inoperative, and for moving said movable shaft away from said fixed shaft to tighten said belt and thereby establish a forward direction driving connection between the shafts, and for moving said movable shaft toward said fixed shaft to disengage said belt and establish a frictional driving connection between the other pair of said pulleys and means for maintaining said belt out of contact with said belt drive pulleys when said transmission is in neutral and reverse driving connection.

6. A belt drive transmission in accordance with claim 5 wherein said control means consists of a toggle control lever, a link toggle member and a control rod, the upper end of said lever and the lower end of said link toggle member being pivotally connected, the central portion of said control lever being pivoted on said slidable bearing, the upper end of said link member being attached to said clutch plate and said control rod being attached to the lower end of said control lever whereby horizontal movement of the said rod changes the position of said driven shaft relative to said fixed shaft.

WILLIAM E. WILLIAMS.

References Cited in the file of this patent

UNITED STATES PATENTS

| Number | Name | Date |
|---|---|---|
| 450,302 | Soule | Apr. 14, 1891 |
| 832,636 | Switzer | Oct. 9, 1906 |
| 2,156,701 | Peterson | May 2, 1939 |